US009300899B2

(12) United States Patent
Kahle

(10) Patent No.: US 9,300,899 B2
(45) Date of Patent: Mar. 29, 2016

(54) METHOD FOR PROJECTING AN IMAGE

(71) Applicant: Trimble Navigation Limited, Sunnyvale, CA (US)

(72) Inventor: Kent Wayne Kahle, Hayward, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 357 days.

(21) Appl. No.: 13/800,011

(22) Filed: Mar. 13, 2013

(65) Prior Publication Data
US 2014/0267936 A1 Sep. 18, 2014

(51) Int. Cl.
*H04N 5/74* (2006.01)
*G01C 15/00* (2006.01)
*H04N 9/31* (2006.01)
*G02B 26/10* (2006.01)
*H04N 1/04* (2006.01)

(52) U.S. Cl.
CPC ............. *H04N 5/74* (2013.01); *G01C 15/002* (2013.01); *G02B 26/101* (2013.01); *H04N 9/3135* (2013.01); *G02B 26/105* (2013.01); *H04N 1/0402* (2013.01); *H04N 1/0443* (2013.01); *H04N 1/0446* (2013.01)

(58) Field of Classification Search
USPC ............... 353/28, 30, 94, 98, 99; 359/196.1, 359/197.1, 201.1, 202.2, 204.1, 204.4, 359/221.2, 226.2
See application file for complete search history.

(56) References Cited

U.S. PATENT DOCUMENTS 6,000,801 A * 12/1999 Dillon et al. ................... 353/28
6,351,324 B1 * 2/2002 Flint .......................... 359/202.1
6,945,652 B2 * 9/2005 Sakata et al. ................... 353/30
7,385,180 B2 * 6/2008 Rueb .......................... G03B 21/28
250/234
7,479,977 B2 1/2009 Choi et al.
7,513,624 B2 * 4/2009 Yavid et al. ..................... 353/31
7,667,887 B2 * 2/2010 Takeda ........................ 359/298
8,760,745 B2 6/2014 Dejong et al.
9,007,532 B2 * 4/2015 Rumreich ..................... 348/744
2005/0237490 A1 * 10/2005 Hibi et al. ....................... 353/30
2007/0002416 A1 * 1/2007 Choi et al. ..................... 359/204
2010/0182668 A1 7/2010 Abe et al.
2012/0281721 A1 11/2012 Dejong et al.

FOREIGN PATENT DOCUMENTS

EP 1870766 A1 12/2007
WO 2012166682 A2 12/2012

OTHER PUBLICATIONS

"PCT/US2014/025098 International Search Report and Written Opinion", Jul. 7, 2014, 17 Pages.

* cited by examiner

*Primary Examiner* — William C Dowling

(57) ABSTRACT

A method of projecting an image onto a viewing surface uses scanning projector, such as a laser-beam-steering pico projector, which scans a laser beam across the viewing surface. Each pixel area on the viewing surface which is included within images defined by a high intensity display digital video data, and each pixel area on the viewing surface which is included within images defined by a low intensity display digital video data are scanned. The projector beam illuminates each pixel area on the viewing surface which is included within images defined by the high intensity display digital video data for a greater period of time than is spent illuminating each pixel area on the viewing surface which is included within images defined by other digital video data.

17 Claims, 2 Drawing Sheets

METHOD FOR PROJECTING AN IMAGE

CROSS-REFERENCE TO RELATED APPLICATIONS

Figure 1:
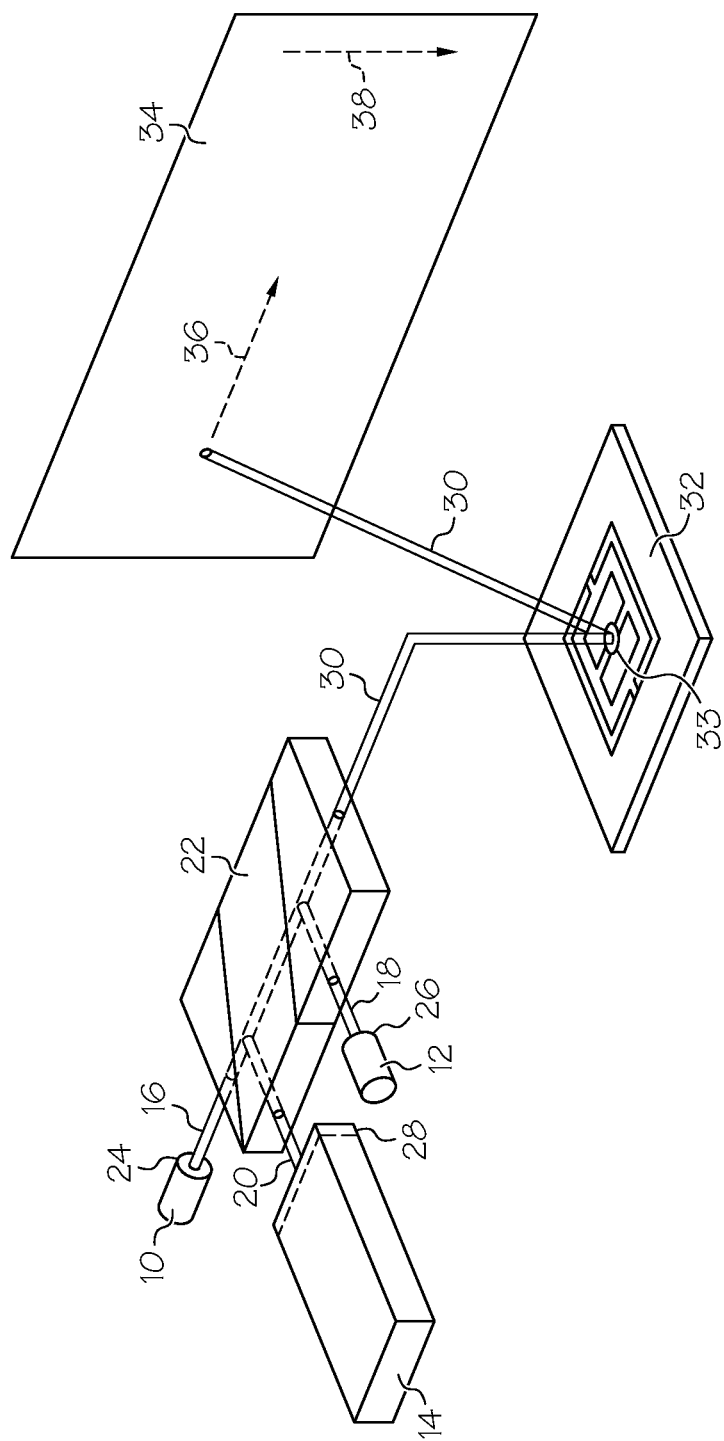

None.

STATEMENT REGARDING FEDERALLY SPONSORED RESEARCH OR DEVELOPMENT

Not Applicable.

BACKGROUND

During building construction projects, such as the interior construction phase of a large new building, or during renovation of an older building, it is useful to refer to Building Information Modeling (BIM) data. This data defines the building structure, including the interior, in three dimensions, and its use increases the productivity of construction workers by facilitating the location and placement of various building construction elements and fixtures. Typically, the BIM model of the building is maintained after the building construction is completed, and can be used over the life of the building for renovation, expansion, and maintenance purposes. The BIM model defines building geometry, spatial relationships, and quantities and properties of building components.

It is extremely useful to be able to locate quickly various construction points within the building interior. As the interior of a building is being finished, connectors, fasteners, anchors and the like are attached to various surfaces, and cuts are made and holes drilled using power saws and drills. All of this must be accomplished at predetermined, precisely defined positions. Teams of workers have been needed to measure and mark predetermined construction points and lines. Performing this task has been tedious and subject to errors, resulting both from measurement mistakes and from accumulated errors. Further, the cost of the layout process, and the time needed to perform the layout process have both been significant.

Layout of the construction points at a building interior construction site has been accomplished in more automated ways, such as for example by using a robotic total station device. The total station is positioned at a fixed, known location and directs a beam of laser light to a desired location. Another approach is disclosed in copending U.S. application Ser. No. 13/800,828, filed on even date herewith, and assigned to the assignee of the present application, in which an image having layout construction points and lines, as well as other information, is projected onto a ceiling, wall or other building surface by a pico projector, with the construction points being accurately located on the surface. (The entire disclosure of this concurrently filed application is incorporated by reference herein.) Pico projectors have power limitations, however, so that the images that they project may be difficult to see if there is a significant amount of ambient light.

SUMMARY

A method of projecting a digital video image onto a viewing surface with pico projector, such as a laser-beam-steering projector, which scans a laser beam across the viewing surface, illuminating pixel areas with a color and intensity of laser beam light defined by digital video data provided to the digital video input of the projector, contemplates identifying a portion of the digital video data that is high intensity display digital video data and a portion of the digital video data that is low intensity display digital video data. The high intensity display digital video data and the low intensity display digital video data are supplied to the digital video input of the pico projector. Each pixel area on the viewing surface which is included within images defined by the high intensity display digital video data, and each pixel area on the viewing surface which is included within images defined by the low intensity display digital video data are scanned. The beam illuminates each pixel area on the viewing surface which is included within images defined by the high intensity display digital video data for a greater period of time than is spent illuminating each pixel area on the viewing surface which is included within images defined by the low intensity display digital video data.

The image defined by high intensity display digital video data may be displayed in a color which differs from the color of display of the image defined by low intensity display digital video data. The image defined by high intensity display digital video data may be displayed in green.

The each pixel area on the viewing surface which is included within images defined by the low intensity display digital video data may be scanned at a scanning speed which is greater than the scanning speed at which each pixel area on the viewing surface which is included within images defined by the high intensity display digital video data are scanned. Each pixel area on the viewing surface which is included within images defined by the high intensity display digital video data may be scanned a plurality of times for each time that each pixel area on the viewing surface which is included within images defined by the low intensity display digital video data is scanned.

BRIEF DESCRIPTION

Figure 2:
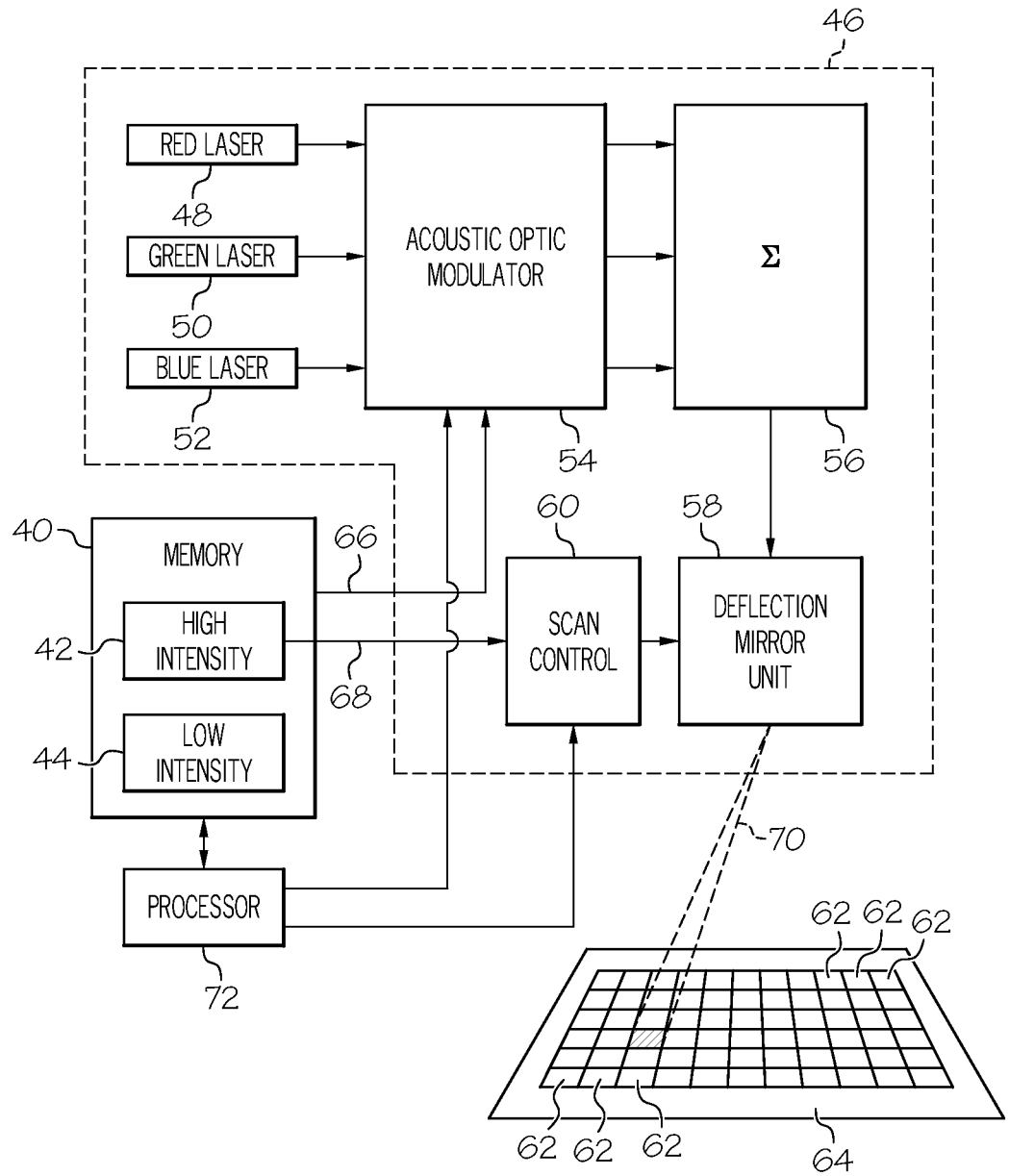

FIG. 1 is a diagrammatic illustration of a laser-beam-steering pico projector; and FIG. 2 is a schematic representation of a laser-beam-steering pico projector, and associated components, useful in explaining the embodiments of the method.

DETAILED DESCRIPTION

In the construction field, blueprints have typically been used by workers to determine where to build walls, drill holes, fasten pipes, and the like. With the advent of computer implemented building design, architects and engineers have accomplished design tasks much more efficiently, and building design data has become readily available in digital form. This has expanded the ways in which building design data can be communicated to construction workers. Digital layout images, similar in content to conventional construction blueprints, may be projected onto building surfaces. The construction points in the images are precisely positioned on the surfaces, eliminating much of the costly manual layout process. The digital layout image shows the worker where to perform various operations, such as drilling holes, fastening anchor bolts, and the like, and also provides instructions about the construction points. The projected image may also include a picture of a building component that might be located at the construction point, such as a pipe, light fixture, or electrical box. The projected work instructions may include information that would be helpful in completing work at the construction point, such as depth and diameter of a hole, size of a fastener, or the torque required to tighten a bolt.

It is important that the specific construction points and lines projected onto the building surface be bright and clear. It will be appreciated that with a blueprint image the worker is not concerned with every pixel of the image but primarily with the construction points and lines on the blueprint. There is no need to waste projection power by illuminating every pixel over an area on the projector surface.

What is needed is to use the available projection energy primarily in the areas needed for viewing the construction points and lines. The brighter the image, the easier it is for a worker to see where he is to drill a hole or perform some other operation. The pico projector used to project the image is typically battery powered, and this makes effective use of the available projection power even more important.

Pico projectors are typically implemented using any of a number of technologies, such as DLP, LCD and LBS projectors. In the normal mode of operation, projectors using any of these technologies have the goal of providing a projected image that is uniformly bright over the entire projected area. This makes sense for the usual projected items, including movies, pictures and presentations. However, the present method recognizes the need to project an image that is not uniform in power so that the available light is largely used in only some areas of the image.

Previously, projectors have not concentrated the projected light power to specific pixel locations. LCD (liquid crystal display) projectors use thousands of tiny mirrors to reflect pixels of light, thereby forming an image. DLP (digital light processing) projectors use thousands of light gates to let pixels of light pass through, thereby forming an image. In either case, a single light source is used to light up all the mirrors or gates at one time. The mirrors and gates can be turned on or off to form the image, but there is no way to redirect the light that is not used in the projected image to other pixels so as to brighten them.

LBS (laser-beam-steering) projectors are different, however, creating an image one pixel at a time, using a directed laser beam. As shown in FIG. 1, an LBS projector includes three lasers, a red laser 10, a blue laser 12, and a green laser 14, which provide red blue and green beams 16, 18 and 20 to a combining prism 22 via acoustic optic modulators 24, 26 and 28, respectively. The three color beams of appropriate brightness are combined into a single beam 30 that is guided by a mirror assembly 32 to a viewing surface 34. The mirror assembly 32 may consist of a single MEM mirror 33 or of two MEM mirrors that are electromechanically pivoted about orthogonal axii to scan laser beam 30 repeatedly across the viewing surface 34. The laser beam 30 is scanned in a first scanning direction, indicated at 36, at a first scanning speed. The laser beam 30 is scanned repeatedly across the viewing surface 34 in a second scanning direction 38 at a second scanning speed. Preferably the second direction 38 is orthogonal to the first scanning direction 36 and the second scanning speed is less than the first scanning speed. Because the scanning speeds are fast enough (the entire image is scanned on the surface 34 at over 60 Hertz), the pixel-by-pixel scan goes unnoticed.

The embodiments of the method described below efficiently use the light from the pico projector to project the blueprint image onto the work surface. Instead of having each pixel have the same intensity of illumination, the light energy is directed mostly into the construction points and lines of the projected image. The methods describe displaying digital video data as digital video images. It will be appreciated that these video images are typically static images which have the appearance of building blueprints or portions of blueprints. If desired, however, moving video images could also be displayed.

As seen in FIG. 2, with BIM information stored in memory 40, the construction lines and points for high intensity display are known, and typically stored in a file 42 separate from the file 44 having the balance of the items to be displayed. The laser-beam-steering projector 46 includes red, green and blue lasers 48, 50, and 52, an acoustic optic modulator 54 (shown as a single unit although each of the lasers 48, 50, and 52 typically has a separate modulator), a combining prism 56, and a deflection mirror unit 58 which reflects light under control of a scan control 60. The laser light is directed to pixels 62 which are arranged in rows and columns on viewing surface 64. It will be appreciated that the representation of the viewing surface 64 and pixels 62 is diagrammatic, and that actually there are thousands of pixels 62 on the surface 64 to form the projected image collectively.

The projector 46 directs laser light to the pixel areas 62 in a way that increases the brightness of the projected image in certain areas without increasing battery consumption. The portion of the digital video data in file 42 in memory 40 that is high intensity display digital video data is identified, and the portion of the digital video data in file 44 in memory 40 that is low intensity display digital video data is identified. The laser-beam-steering pico projector 46, as shown in FIG. 2, is responsive to digital video data supplied to the digital video input on lines 66 and 68 for directing the projector beam 70 in repeating sequence to each of a plurality of pixel areas 62 on the viewing surface 64 and illuminating the pixel areas 62 with a color and intensity of laser light defined by the digital video data provided at the digital video input. A processor 72 with outputs to scan control 60 and acoustic optic modulator 54, alters the scanning speed of the laser-beam-steering pico projector 46 such that the beam illuminates each pixel area on the viewing surface which is included within images defined by the high intensity display digital video data for a greater period of time than is spent illuminating the other pixel areas. Thus, the first scanning speed and the second scanning speed are both slowed when the beam illuminates pixel areas 62 on the viewing surface 64 that are included within images defined by the high intensity display digital video data. If desired, the image defined by high intensity display digital video data may be displayed in a color which differs from the color of display of the image defined by low intensity display digital video data. For example, the image defined by high intensity display digital video data may be displayed in green, as green is a color that is most easily seen with the human eye. It will be appreciated, however, that the laser beam 70 will be at its highest power output when the maximum amount of red, green and blue laser light is being generated and combined into a single beam.

In one arrangement, instead of scanning the beam of light to all of the pixel areas with the high intensity pixel areas receiving significantly more dwell time than the balance of the pixel areas, the light may be directed on only a limited subset of the total number of pixels on the viewing surface. Pixels having no images associated with them, are ignored entirely. Light is only directed where light is needed. The scan rate can be greatly reduced as there is less projected image to fill, and the slower scan rate produces much higher light energy density, providing a brighter image.

In an alternative construction, the system could use LED's for light sources. LED's are less expensive, but require focus optics, whereas collimated laser light does not. Additionally, the use of lasers as light sources provides the opportunity for projecting images on all types of surfaces.

Additional work instructions or attribute data, such as drill size, depth, torque, etc., may be shown in a different color or shade from that used for the high intensity images, providing for clear delineation for the construction worker. The low intensity data may also provide for visualization of objects that will be secured in the illustrated location, such as light fixtures, plumbing hangers, electrical boxes, and the like, and these can be shown in yet another color.

If greater brightness is required, two light source/mirror systems may be combined such that one projects just the construction lines and points of the BIM blueprint on the work surface, and the other projects the attribute data, work instructions and visualization of objects on work surface. The alignment of these two systems would not be required to be perfect, as the BIM blueprint information is the key information that must be precisely located. The other information needs to be aligned generally, but does not have to be precisely positioned.

Other approaches may be used to illuminate each pixel area on the viewing surface which is included within images defined by the high intensity display digital video data for a greater period of time than is spent illuminating the other pixel areas. What is required is scanning such that the beam illuminates each pixel area on the viewing surface which is included within images defined by the high intensity display digital video data for a greater period of time than is spent illuminating each pixel area on the viewing surface which is included within images defined by the other digital video data. For example, each pixel area on the viewing surface which is included within images defined by the high intensity display digital video data may be scanned repeatedly prior to each scanning of the pixel areas on the viewing surface which are included within images defined by the low intensity display digital video data.

The methods have been described with respect to pico projectors since pico projectors have limited projection power and these methods deal with approaches to increasing the intensity of an image in those areas of the image requiring better visibility. However, these methods may also be used with larger projectors, as well, when improved image brightness in some areas is needed.

What is claimed is:

1. A method of projecting an image onto a viewing surface with a projector which repeatedly scans a laser beam across the viewing surface in a first scanning direction at a first scanning speed and repeatedly scans the laser beam across the viewing surface in a second scanning direction at a second scanning speed, said second direction being orthogonal to said first scanning direction and said second scanning speed being less than said first scanning speed, to display digital video data, comprising the steps of:
    identifying that portion of the digital video data that is high intensity display digital video data and the portion of the digital video data that is low intensity display digital video data;
    providing a laser-beam-steering pico projector responsive to a digital video input for directing the projector beam in repeating sequence to each of a plurality of pixel areas on said viewing surface and illuminating said pixel areas with a color and intensity of laser beam light defined by digital video data provided at said digital video input;
    supplying digital video data to said digital video input of said laser-beam-steering pico projector; and
    altering the scanning speed of said laser-beam-steering pico projector such that the beam illuminates each pixel area on said viewing surface which is included within images defined by said high intensity display digital video data for a greater period of time than is spent illuminating the other pixel areas, wherein said each pixel area on said viewing surface which is included within images defined by said high intensity display digital video data for a greater period of time than is spent illuminating the other pixel areas represent construction points and lines.

2. The method of projecting an image onto a viewing surface with a projector according to claim 1, in which said first scanning speed and said second scanning speed are both slowed when said beam illuminates pixel areas on said viewing surface that are included within images defined by said high intensity display digital video data.

3. The method of projecting an image onto a viewing surface with a projector according to claim 1, in which the image defined by high intensity display digital video data is displayed in a color which differs from the color of display of the image defined by low intensity display digital video data.

4. The method of projecting an image onto a viewing surface with a projector according to claim 3, in which the image defined by high intensity display digital video data is displayed in green.

5. A method of projecting a digital video image onto a viewing surface with a laserbeam-steering pico projector which scans a laser beam across the viewing surface, illuminating pixel areas with a color and intensity of laser beam light defined by digital video data provided to the digital video input of the projector, comprising the steps of:
    identifying the portion of the digital video data that is high intensity display digital video data and the portion of the digital video data that is low intensity display digital video data;
    supplying high intensity display digital video data to said digital video input of said laser-beam-steering pico projector;
    scanning repeatedly each pixel area on said viewing surface which is included within images defined by said high intensity display digital video data; and
    supplying low intensity display digital video data to said digital video input of said laser-beam-steering pico projector; and
    after said scanning repeatedly each pixel area on said viewing surface which is included within images defined by said high intensity display digital video data, scanning each pixel area on said viewing surface which is included within images defined by said low intensity display digital video data,
    whereby the beam illuminates each pixel area on said viewing surface which is included within images defined by said high intensity display digital video data for a greater period of time than is spent illuminating the other pixel areas.

6. The method of projecting a digital video image onto a viewing surface with a laserbeam-steering pico projector according to claim 5, in which the image defined by high intensity display digital video data is displayed in a color which differs from the color of display of the image defined by low intensity display digital video data.

7. The method of projecting an image onto a viewing surface with a laser-beam-steering pico projector according to claim 6, in which the image defined by high intensity display digital video data is displayed in green.

8. A method of projecting a digital video image onto a viewing surface with a projector which scans a laser beam across the viewing surface, illuminating pixel areas with a color and intensity of laser beam light defined by digital video data provided to the digital video input of the projector, comprising the steps of:

identifying the portion of the digital video data that is high intensity display digital video data and the portion of the digital video data that is low intensity display digital video data;

supplying said high intensity display digital video data and said low intensity display digital video data to said digital video input of said laser-beam-steering pico projector; and scanning each pixel area on said viewing surface which is included within images defined by said high intensity display digital video data, and scanning each pixel area on said viewing surface which is included within images defined by said low intensity display digital video data, such that the beam illuminates each pixel area on said viewing surface which is included within images defined by said high intensity display digital video data for a greater period of time than is spent illuminating each pixel area on said viewing surface which is included within images defined by said low intensity display digital video data, wherein the image defined by high intensity display digital video data is displayed in a color which differs from the color of display of the image defined by low intensity display digital video data.

9. The method of projecting an image onto a viewing surface with a projector according to claim 8, in which the image defined by high intensity display digital video data is displayed in green.

10. The method of projecting a digital video image onto a viewing surface with a projector according to claim 8, in which the step of scanning each pixel area on said viewing surface which is included within images defined by said high intensity display digital video data, and scanning each pixel area on said viewing surface which is included within images defined by said low intensity display digital video data, includes the step of scanning each pixel area on said viewing surface which is included within images defined by said low intensity display digital video data at a scanning speed which is greater than the scanning speed at which each pixel area on said viewing surface which is included within images defined by said high intensity display digital video data are scanned.

11. The method of projecting a digital video image onto a viewing surface with a projector according to claim 8, in which the step of scanning each pixel area on said viewing surface which is included within images defined by said high intensity display digital video data, and scanning each pixel area on said viewing surface which is included within images defined by said low intensity display digital video data, includes the step of scanning each pixel area on said viewing surface which is included within images defined by said high intensity display digital video data a plurality of times for each time that each pixel area on said viewing surface which is included within images defined by said low intensity display digital video data is scanned.

12. A method of projecting an image onto a viewing surface with a pico projector which repeatedly scans a light beam across the viewing surface in a first scanning direction at a first scanning speed and repeatedly scans the laser beam across the viewing surface in a second scanning direction at a second scanning speed, said second direction being orthogonal to said first scanning direction and said second scanning speed being less than said first scanning speed, to display digital video data, comprising the steps of:

identifying that portion of the digital video data that is high intensity display digital video data and the portion of the digital video data that is low intensity display digital video data;

providing a pico projector responsive to a digital video input for directing the projector beam in repeating sequence to each of a plurality of pixel areas on said viewing surface and illuminating said pixel areas with a color and intensity of light defined by digital video data provided at said digital video input;

supplying digital video data to said digital video input of said pico projector; and altering the scanning speed of said pico projector such that the beam illuminates each pixel area on said viewing surface which is included within images defined by said high intensity display digital video data for a greater period of time than is spent illuminating the other pixel areas, wherein said each pixel area on said viewing surface which is included within images defined by said high intensity display digital video data for a greater period of time than is spent illuminating the other pixel areas represent construction points and lines.

13. The method of projecting an image onto a viewing surface with a pico projector according to claim 12, in which said first scanning speed and said second scanning speed are both slowed when said beam illuminates pixel areas on said viewing surface that are included within images defined by said high intensity display digital video data.

14. The method of projecting an image onto a viewing surface with a pico projector according to claim 12, in which the image defined by high intensity display digital video data is displayed in a color which differs from the color of display of the image defined by low intensity display digital video data.

15. A method of projecting a digital video image onto a viewing surface with a projector which scans a light beam across the viewing surface, illuminating pixel areas with a color and intensity of light defined by digital video data provided to the digital video input of the projector, comprising the steps of:

identifying the portion of the digital video data that is high intensity display digital video data and the portion of the digital video data that is low intensity display digital video data;

supplying said high intensity display digital video data and said low intensity display digital video data to said digital video input of said pico projector; and scanning each pixel area on said viewing surface which is included within images defined by said high intensity display digital video data, and scanning each pixel area on said viewing surface which is included within images defined by said low intensity display digital video data, such that the light beam illuminates each pixel area on said viewing surface which is included within images defined by said high intensity display digital video data for a greater period of time than is spent illuminating each pixel area on said viewing surface which is included within images defined by said low intensity display digital video data, wherein said each pixel area on said viewing surface which is included within images defined by said high intensity display digital video data for a greater period of time than is spent illuminating the other pixel areas represent construction points and lines.

16. The method of projecting a digital video image onto a viewing surface with a projector according to claim 15, in which the step of scanning each pixel area on said viewing surface which is included within images defined by said high intensity display digital video data, and scanning each pixel area on said viewing surface which is included within images defined by said low intensity display digital video data, includes the step of scanning each pixel area on said viewing surface which is included within images defined by said low intensity display digital video data at a scanning speed which is greater than the scanning speed at which each pixel area on said viewing surface which is included within images defined by said high intensity display digital video data are scanned.

17. The method of projecting a digital video image onto a viewing surface with a projector according to claim 15, in which the step of scanning each pixel area on said viewing surface which is included within images defined by said high intensity display digital video data, and scanning each pixel area on said viewing surface which is included within images defined by said low intensity display digital video data, includes the step of scanning each pixel area on said viewing surface which is included within images defined by said high intensity display digital video data a plurality of times for each time that each pixel area on said viewing surface which is included within images defined by said low intensity display digital video data is scanned.

\* \* \* \* \*